(12) United States Patent
Danilov et al.

(10) Patent No.: US 10,776,322 B2
(45) Date of Patent: Sep. 15, 2020

(54) TRANSFORMATION PROCESSING FOR OBJECTS BETWEEN STORAGE SYSTEMS

(71) Applicant: EMC IP Holding Company LLC, Hopkinton, MA (US)

(72) Inventors: Mikhail Danilov, Saint Petersburg (RU); Gregory Skripko, Saint Petersburg (RU); Nikita Gutsalov, Saint Petersburg (RU); Ivan Tchoub, Saint Petersburg (RU); Alexander Fedorov, Saint Petersburg (RU); Sergey Koyushev, Saint Petersburg (RU); Maria Gavrilova, Chusovo (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 234 days.

(21) Appl. No.: 15/620,892

(22) Filed: Jun. 13, 2017

(65) Prior Publication Data

US 2018/0165299 A1   Jun. 14, 2018

(30) Foreign Application Priority Data

Dec. 13, 2016   (RU) ................................ 2016148859

(51) Int. Cl.
*G06F 16/00* (2019.01)
*G06F 16/178* (2019.01)
*G06F 16/25* (2019.01)
*G06F 16/28* (2019.01)

(52) U.S. Cl.
CPC ........ *G06F 16/1794* (2019.01); *G06F 16/258* (2019.01); *G06F 16/289* (2019.01)

(58) Field of Classification Search
CPC combination set(s) only.
See application file for complete search history.

(56) References Cited

U.S. PATENT DOCUMENTS

| | | |
|---|---|---|
| 6,070,003 A | 5/2000 | Gove et al. |
| 6,550,035 B1 | 4/2003 | Okita |
| 7,549,110 B2 | 6/2009 | Stek et al. |
| 7,559,007 B1 | 7/2009 | Wilkie |
| 7,581,156 B2 | 8/2009 | Manasse |
| 8,458,515 B1 | 6/2013 | Saeed |
| 8,532,212 B2 | 9/2013 | Ito |
| 8,683,296 B2 | 3/2014 | Anderson et al. |
| 8,683,300 B2 | 3/2014 | Stek et al. |
| 8,762,642 B2 | 6/2014 | Bates et al. |

(Continued)

OTHER PUBLICATIONS

Response to U.S. Non-Final Office Action dated Nov. 27, 2017 for U.S. Appl. No. 15/186,576, Response filed Feb. 23, 2018; 7 pages.

(Continued)

*Primary Examiner* — Farhan M Syed
(74) *Attorney, Agent, or Firm* — Daly, Crowley, Mofford & Durkee, LLP

(57) ABSTRACT

A computer program product, system, and method for determining containers, within a secondary storage, to transform; determining users having access to the containers to transform; synchronizing storage configuration between the secondary storage and a primary storage; enumerating objects within the containers to transform; and adding object identifiers and object metadata for the enumerated objects to an object index within the primary storage.

17 Claims, 5 Drawing Sheets

(56) References Cited

U.S. PATENT DOCUMENTS

| | | | |
|---|---|---|---|
| 8,914,706 | B2 | 12/2014 | Anderson |
| 9,588,849 | B2* | 3/2017 | Sinha .................. G06F 3/067 |
| 9,760,446 | B2* | 9/2017 | Hammer ............... G06F 16/00 |
| 9,928,005 | B2* | 3/2018 | Sinha .................. G06F 16/00 |
| 2005/0038968 | A1 | 2/2005 | Iwamura et al. |
| 2006/0105724 | A1 | 5/2006 | Nakao |
| 2006/0147219 | A1 | 7/2006 | Yoshino et al. |
| 2008/0126357 | A1 | 5/2008 | Casanova et al. |
| 2009/0112953 | A1* | 4/2009 | Barsness ............ G06F 12/0269 |
| 2009/0249005 | A1* | 10/2009 | Bender ............... G06F 11/1435 |
| | | | 711/162 |
| 2010/0091842 | A1 | 4/2010 | Ikeda et al. |
| 2010/0180176 | A1 | 7/2010 | Yosoku et al. |
| 2010/0246663 | A1 | 9/2010 | Citta et al. |
| 2011/0053639 | A1 | 3/2011 | Etienne Suanez et al. |
| 2011/0055494 | A1 | 3/2011 | Roberts et al. |
| 2011/0196900 | A1 | 8/2011 | Drobychev et al. |
| 2012/0051208 | A1 | 3/2012 | Li et al. |
| 2012/0106595 | A1 | 5/2012 | Bhattad et al. |
| 2013/0067187 | A1 | 3/2013 | Moss et al. |
| 2014/0046997 | A1* | 2/2014 | Dain .................. H04L 67/2861 |
| | | | 709/201 |
| 2015/0363270 | A1* | 12/2015 | Hammer ............. G06F 11/1451 |
| | | | 711/162 |
| 2016/0004605 | A1* | 1/2016 | Ahn ..................... G06F 16/00 |
| | | | 707/679 |
| 2016/0210202 | A1* | 7/2016 | Sinha .................. G06F 16/00 |
| 2016/0239384 | A1 | 8/2016 | Slik et al. |
| 2017/0046127 | A1 | 2/2017 | Fletcher et al. |
| 2017/0075947 | A1 | 3/2017 | Kurilov et al. |
| 2017/0083549 | A1 | 3/2017 | Danilov et al. |
| 2017/0131912 | A1* | 5/2017 | Sinha ................. G06F 11/1469 |
| 2018/0113769 | A1* | 4/2018 | Ahn ................... G06F 11/1451 |
| 2019/0236051 | A1* | 8/2019 | Datta ................. G06F 16/128 |

OTHER PUBLICATIONS

U.S. Final Office Action dated Mar. 1, 2018 for U.S. Appl. No. 15/193,145; 32 pages.
U.S. Final Office Action dated Mar. 2, 2018 for U.S. Appl. No. 15/193,409; 10 pages.
U.S. Non-Final Office Action dated Oct. 5, 2017 for U.S. Appl. No. 15/193,407; 14 pages.
U.S. Non-Final Office Action dated Oct. 18, 2017 for U.S. Appl. No. 15/193,145; 21 pages.
U.S. Non-Final Office Action dated Sep. 15, 2017 for U.S. Appl. No. 15/193,409; 12 pages.
U.S. Appl. No. 15/186,576, filed Jun. 2016, Malygin et al.
U.S. Appl. No. 15/193,141, filed Jun. 2016, Danilov et al.
U.S. Appl. No. 15/193,142, filed Jun. 2016, Danilov et al.
U.S. Appl. No. 15/193,144, filed Jun. 2016, Kurilov et al.
U.S. Appl. No. 15/193,145, filed Jun. 2016, Fomin et al.
U.S. Appl. No. 15/193,407, filed Jun. 2016, Danilov et al.
U.S. Appl. No. 15/193,409, filed Jun. 2016, Trusov et al.
U.S. Appl. No. 15/281,172, filed Sep. 2016, Trusov et al.
U.S. Appl. No. 15/398,819, filed Jan. 2017, Danilov et al.
U.S. Appl. No. 15/398,826, filed Jan. 2017, Danilov et al.
U.S. Appl. No. 15/398,832, filed Jan. 2017, Danilov et al.
U.S. Appl. No. 15/620,897, filed Jun. 2017, Danilov et al.
U.S. Appl. No. 15/620,898, filed Jun. 2017, Danilov et al.
U.S. Appl. No. 15/620,900, filed Jun. 2017, Danilov et al.
Anvin, "The mathematics of RAID-6;" Zytor; Dec. 20, 2011; 9 Pages.
Blomer et al.; "An XOR-Based Erasure-Resilient Coding Scheme;" International Computer Science Institute, Berkley, California; 1995; 19 Pages.
U.S. Non-Final Office Action dated Feb. 2, 2018 for U.S. Appl. No. 15/398,826; 16 Pages.
Office Action dated Nov. 27, 2017 from U.S. Appl. No. 15/186,576; 11 Pages.
Office Action dated Dec. 14, 2017 from U.S. Appl. No. 15/281,172; 9 Pages.
Response to Office Action dated Sep. 15, 2017 from U.S. Appl. No. 15/193,409, filed Dec. 14, 2017; 11 Pages.
Response to Office Action dated Oct. 5, 2017 from U.S. Appl. No. 15/193,407, filed Dec. 20, 2017; 12 Pages.
Response to Office Action dated Oct. 18, 2017 from U.S. Appl. No. 15/193,145, filed Jan. 17, 2018; 12 Pages.

* cited by examiner

TRANSFORMATION PROCESSING FOR OBJECTS BETWEEN STORAGE SYSTEMS

CROSS REFERENCE TO RELATED APPLICATIONS

This application claims priority to Russian Patent Application number 2016148859, filed Dec. 13, 2016, and entitled "DATA TRANSFORMATION FOR OBJECTION STORAGE," which is incorporated herein by reference in its entirety.

BACKGROUND

Object storage systems may provide a wide range of storage services, while achieving high scalability, availability, and serviceability. An example of an object storage system is Elastic Cloud Storage (ECS) from Dell EMC of Hopkinton, Mass. Object storage systems may support multiple users, multiple containers (sometimes referred to as "pools" or "buckets") per user, access control mechanisms, and one or more Application Programming Interfaces (APIs) via which users can query data objects.

Customers interested in taking advantage of modern object storage may have a large amount of data stored in legacy storage. Traditionally, if a customer with data in a legacy storage system wanted to take advantage of a modern object storage system, the customer would move the data from legacy storage to object storage using a migration process. However, migrating data between two storage systems can be time consuming and can introduce unwanted load on both systems. An alternative to data migration is data transformation, whereby a customer can seamlessly access data in legacy storage via a modern object storage system API without having to move all data from legacy storage.

SUMMARY

Described herein are embodiments of systems and methods to transform legacy data into object storage. Some embodiments allow use of object system services on legacy data without moving data from legacy storage.

According to one aspect of the disclosure, a method comprises: determining containers, within a secondary storage, to transform; determining users having access to the containers to transform; synchronizing storage configuration between the secondary storage and a primary storage; enumerating objects within the containers to transform; and adding object identifiers and object metadata for the enumerated objects to an object index within the primary storage.

s In some embodiments, determining users having access to the containers to transform includes determining users that have read or write access to one or more of the containers to transform. In certain embodiments, synchronizing storage configuration between the secondary storage and a primary storage includes synchronizing storage users and containers between the secondary storage and a primary storage. In particular embodiments, enumerating objects within the containers to transform includes generating a transformation user in the secondary storage having access to each of the containers to transform enumerating objects within the containers to transform using the transformation user. In some embodiments, receiving, as input, a network address of the secondary storage and credentials of a user in secondary storage having sufficient privileges to allow for data transformation.

According to another aspect of the disclosure, a system comprises one or more processors; a volatile memory; and a non-volatile memory storing computer program code that when executed on the processor causes execution across the one or more processors of a process operable to perform embodiments of the method described hereinabove.

According to yet another aspect of the disclosure, a computer program product tangibly embodied in a non-transitory computer-readable medium, the computer-readable medium storing program instructions that are executable to perform embodiments of the method described hereinabove.

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the structures and techniques sought to be protected herein, some terms are explained. In certain embodiments, the term "storage system" may encompass private or public cloud computing systems for storing data as well as systems for storing data comprising virtual infrastructure and those not comprising virtual infrastructure. In some embodiments, the term "I/O request" (or simply "I/O") may refer to a request to read and/or write data. In many embodiments, the terms "client," "user," and "application" may refer to any person, system, or other entity that may send I/O requests to a storage system.

In certain embodiments, the term "storage device" may refer to any non-volatile memory (NVM) device, including hard disk drives (HDDs), flash devices (e.g., NAND flash devices), and next generation NVM devices, any of which may be accessed locally and/or remotely (e.g., via a storage attached network (SAN)). In some embodiments, the term "storage device" may also refer to a storage array comprising one or more storage devices. In various embodiments, the term "object" refers to an arbitrary-sized collection of user data that can be stored across one or more storage devices and accessed using I/O requests.

Figure 1:
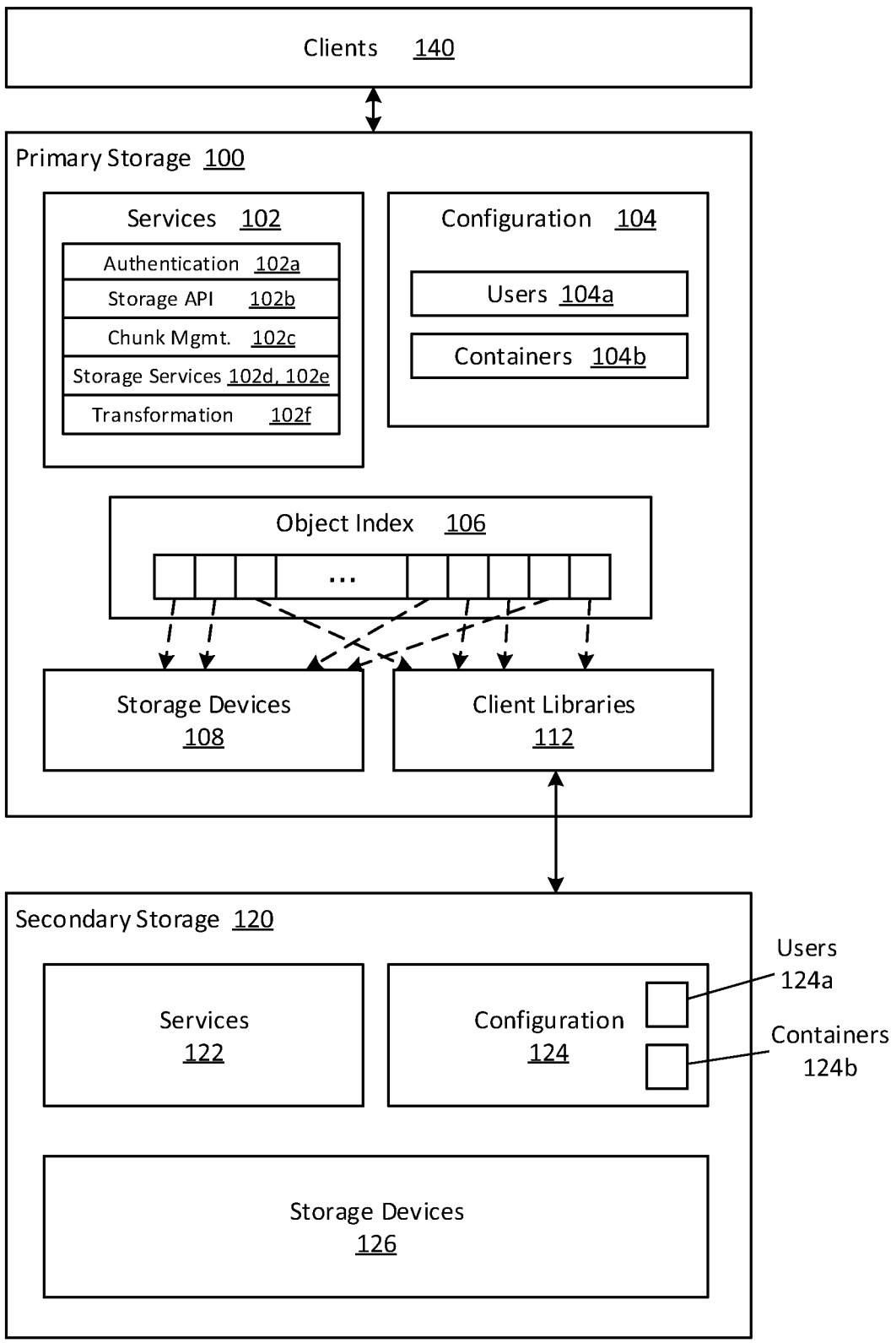
FIG. 1 is a block diagram of a primary storage system and a secondary storage system under transformation, in accordance with an embodiment of the disclosure.

Referring to the embodiment of FIG. 1, a primary storage system 100 includes one or more services 102, storage configuration 104, an object index 106, one or more storage devices 108, and a transformation service 102f. A secondary storage system 120 includes one or more services 122, storage configuration 124, and one or more storage devices 126.

In the embodiment shown, the secondary storage system 120 may be under transformation by the primary storage system 100, meaning that clients 140 can access objects stored in secondary storage 120 via the primary storage system 100. In some embodiments, such an arrangement may allow applications to access legacy data (e.g., objects in secondary storage 120) using the features and capabilities of a more modern storage system (e.g., primary storage 100) without having to migrate the legacy data. In many embodiments, when a client retrieves an object stored within secondary storage 120, the primary storage system 100 may read the object from secondary storage using an appropriate client library 112 and send the object back to the client 140 as if it was stored in the primary storage.

In various embodiments, the primary storage system 100 and the secondary storage system 120 include one or more of the following features: logical grouping of objects into containers (sometimes referred to as "pools" or "buckets"); support for multiple users (sometimes referred to as "profiles"), whereby each user can be granted to access to one or more containers; data query capabilities, including the ability to enumerate all objects within a given container or a given set of containers; network-based access restrictions (sometimes referred to as "IP restrictions") that can be used to limit access to the storage system from designated clients (e.g., from designated IP addresses).

In many embodiments, the primary and/or secondary storage systems are object storage systems (or "object stores"). In some embodiments, the primary and/or secondary storage systems are distributed storage systems (or "clusters") having a plurality of nodes. In certain embodiments, the primary storage system 100 shown in FIG. 1 may correspond to a single node of a distributed storage system. In such embodiments, an I/O request sent from a client may be received at an arbitrary node within the cluster and the receiving node may perform local request processing and/or may delegate request processing to one or more other nodes within the cluster. In particular embodiments, the primary storage system may be provided as Elastic Cloud Storage (ECS) from Dell EMC of Hopkinton, Mass.

Referring again to FIG. 1, primary storage services 102 may include services to process I/O requests and to manage data stored within the storage devices 108. In the embodiment of FIG. 1, primary storage services 102 include: an authentication service 102*a* to authenticate requests from clients; storage API services 102*b* to parse and interpret requests from clients; a storage chunk management service 102*c* to facilitate storage chunk allocation/reclamation for different storage system needs and monitor storage chunk health and usage; a storage server management service 102*d* to manage available storage devices capacity and to track storage devices states; a storage server service 102*e* to interface with the storage devices; and a transformation service 102*f*, which is described in detail below. In certain embodiments, the storage API services 102*b* may implement storage APIs compatible with EMC Centera CAS (Content-Addressable Storage) and/or Amazon S3 API.

Referring also to FIG. 1, primary storage configuration 104 includes user configuration 104*a* comprising information about users defined within primary storage 100, and container configuration 104*b* comprising information about containers defined within primary storage 100. The secondary storage configuration 124 similarly includes user configuration 124*a* and container configuration 124*b*. In some embodiments, primary and/or secondary storage configuration may include access control information (e.g., which users can access which containers and/or network-based access restriction information).

In many embodiments, primary storage object index 106 includes metadata for objects stored within the primary storage devices 108. In some embodiments, where the primary storage system is distributed, the object index 106 may include metadata for objects stored at the local node 100, as well as objects stored at remote nodes. In many embodiments, each object stored within primary storage 108 may be identified by a unique object id (or "key") and the object index 106 may maintain a mapping between object identifiers ("object ids") and object metadata. In various embodiments, the object index 106 may track the physical storage location of each object. In some embodiments, object metadata may include arbitrary user-defined metadata.

Referring again to FIG. 1, object index 106 may also include metadata for objects stored within secondary storage 120. Object IDs and object metadata from secondary storage 120 may be added to the primary storage object index 106 as part of the data transformation process, as described below. In certain embodiments, the object index 106 may include a per-object metadata field to indicate if an object is stored in primary storage 100 or secondary storage 120, as illustrated with dashed lines in FIG. 1. In some embodiments, storage services 102 can use this information to seamlessly process I/O requests for objects in both primary storage and secondary storage.

In many embodiments, the primary storage system 100 may include one or more client libraries 112 configured to access secondary storage 120. For example, a client library 112 could include an implementation of an API supported by the secondary storage system 120 (e.g., an OpenStack Swift API or a Centera CAS API implementation).

Referring also to FIG. 1, the transformation service 102*f* is configured to perform data transformation processing for one or more secondary storage systems 120. To commence transformation for secondary storage 120, the transformation service 102*f* may receive as input a network address of the secondary storage system 120 and credentials of a user in secondary storage having sufficient privileges to allow for data transformation. In some embodiments, data transformation can be applied to some, but not all, containers in secondary storage. In such embodiments, the list of containers in secondary storage to transform may also be received as an input. In some embodiments, the transformation service 102*f* may automatically connect to secondary storage 120, query a list of containers that are candidates for transformation, and then prompt a user (e.g., via an administrative user interface) to select which of these containers should be transformed.

In many embodiments, once the list of containers to be transformed is determined, the transformation service 102*f* uses this information to generate a list of users in secondary storage that may be affected by the data transformation. In some embodiments, the user list may include all the users that have rights (e.g., read and/or write permissions) on at least one container in the list of containers to be transformed and/or have any other relation to at least one container from the list (e.g. some storages support so called home container for each user).

In various embodiments, transformation service 102*f* uses the information gathered to create similar configuration within primary storage 100 (i.e., the primary and secondary configurations may be "synchronized" in part). In particular embodiments, a container may be generated in primary storage for each container in secondary storage to be transformed. Likewise, in some embodiments, a user may be generated in primary storage for each user in secondary storage that may be affected by the data transformation and given corresponding access privileges.

Referring back to FIG. 1, after storage configuration has been synchronized, the primary storage system 100 can begin processing I/O requests for clients that rely on data within secondary storage 120. Thus, applications that previously connected directly to secondary storage 120 can be switched over to connect to primary storage 100. In various embodiments, the transformation service 102f may use the network-based access restriction feature of the secondary storage system to assure that there is no direct access to secondary storage 120 that could lead to data inconsistency as a result of data transformation. For example, transformation service 102f may block access from all IP addresses except for those associated with the primary storage system 100. In some embodiments, where the primary storage system is distributed, transformation service 102f may grant access to any node 100 that may perform data transformation.

Referring also to FIG. 1, to perform the actual data transformation, transformation service 102f uses data query capabilities of the secondary storage system 120 to enumerate the objects within each of the containers to be transformed. In certain embodiments, this processing may be decomposed into many tasks that can be performed in parallel across one or more nodes of the primary storage system. In some embodiments, during enumeration, the transformation service 102f may read metadata associated with each object, and store the object ID's and metadata in the primary storage object index 106. In certain embodiments, the transformation service 102f uses a dedicated user within secondary storage (referred to herein as a "transformation user," shown in FIG. 2) to enumerate objects across the containers.

In various embodiments, when transformation is in progress, the primary storage system 100 may act as a proxy for secondary storage 120. For example, if a client 140 attempts to read an object that has not yet been added to the object index 106, the read may be proxied to the secondary storage 120.

Referring again to FIG. 1, during and after transformation, the primary storage system 100 maintains consistency between the object index 106 and the secondary storage. If an object is deleted from one of the secondary storage 120 containers under transformation, the corresponding object information is deleted from the object index 106. Likewise, if an object is added to one of the secondary storage containers under transformation, the object's ID and metadata are added to the object index.

In many embodiments, a single primary storage system may be used to transform multiple legacy storage systems simultaneously.

Figure 2:
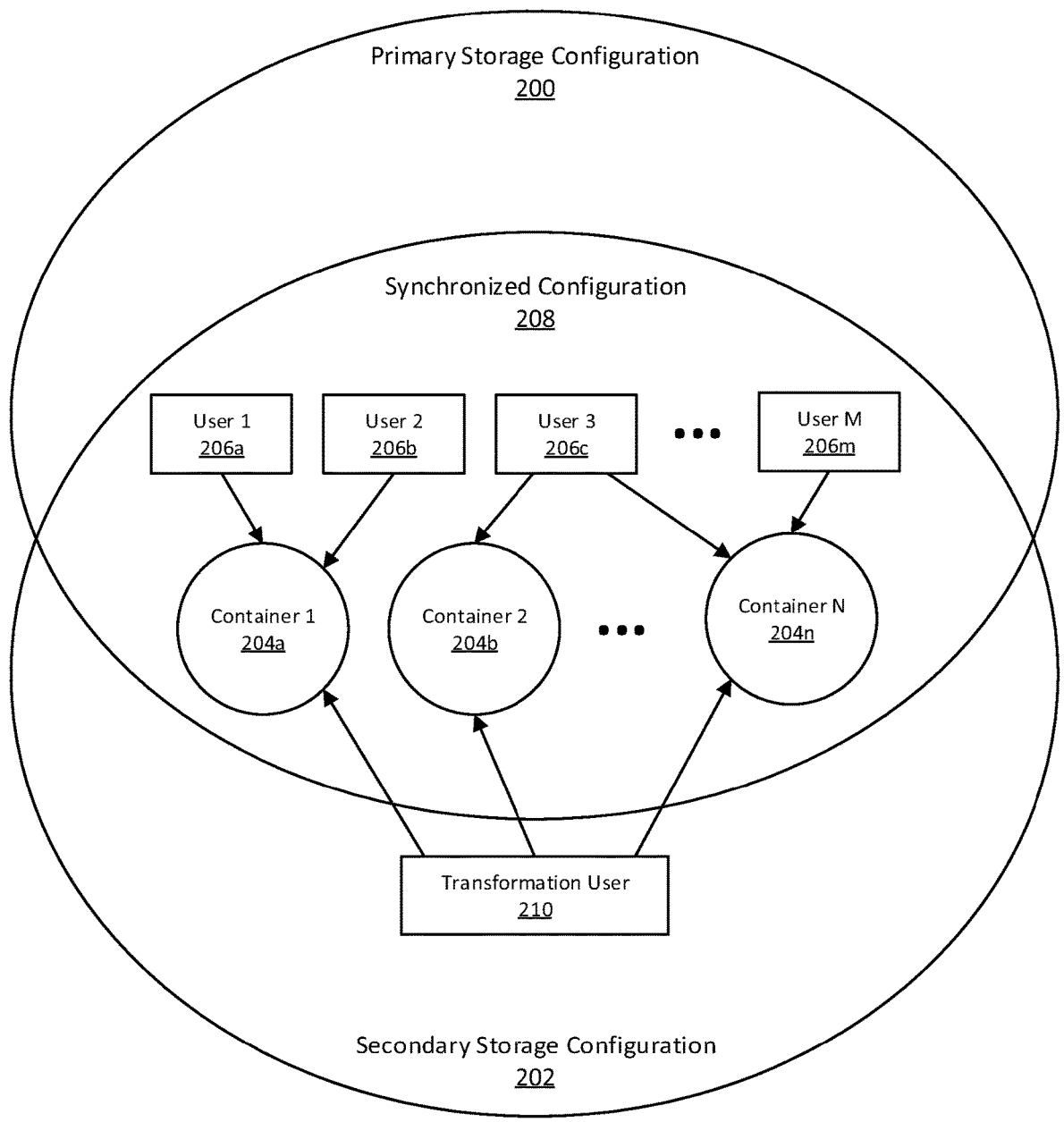
FIG. 2 is a diagram showing storage configuration synchronized between primary and secondary storage systems, in accordance with embodiments of the disclosure.

FIG. 2 illustrates how a transformation service (e.g., service 102f in FIG. 1) may synchronize configuration between primary and secondary storage systems, according to some embodiments. Primary storage configuration 200 and secondary storage configuration 202 in FIG. 2 may correspond to primary and secondary configuration 104 and 124, respectively, in FIG. 1.

Secondary storage configuration 202 may include a plurality of containers 204a . . . 204n (204 generally) and a plurality of users 206a . . . 206m (206 generally). Users 206 may correspond to users within the secondary storage system that exist prior to data transformation commencing. A given user 206 may be authorized to access one or more containers. For example, as illustrated by arrows in FIG. 2, a first user 206a and a second user 206b may be authorized to access a first container 204a, a third user 206c may be authorized to access both a second container 204b and a third container 204n, and so on. The containers 204 may correspond to the list of containers to be transformed (e.g., the list specified by a user). The users 206 can be discovered by the transformation service using API calls provided by the secondary storage system.

For each secondary storage container to be transformed, the transformation service may generate a corresponding container within the primary storage configuration 200. In addition, for any users authorized to access one of those containers, the transformation service may generate a corresponding user within the primary storage configuration 200 having similar privileges. The result is that portions of the secondary configuration 202 are synchronized with primary storage. For example, synchronization may result in containers 204 and users 206 existing within both the primary and secondary storage systems, as illustrated in FIG. 2 as the intersection 208 of ovals 200 and 202.

In some embodiments, the transformation service generates a transformation user 210 within secondary storage. In certain embodiments, the transformation user 210 is a special user generated for the purpose of efficiently enumerating (e.g., querying) objects within secondary storage across multiple containers. In many embodiments, the transformation service may grant the transformation user 210 permission to query the consents of all containers being transformed. In some embodiments, querying multiple containers in secondary storage using a single user may be more efficient than using multiple users. In some embodiments, the transformation user 210 exists in the secondary storage system, but not the primary storage system. In many embodiments, the transformation service deletes the transformation user 210 from secondary storage after transformation is complete.

Figure 3:
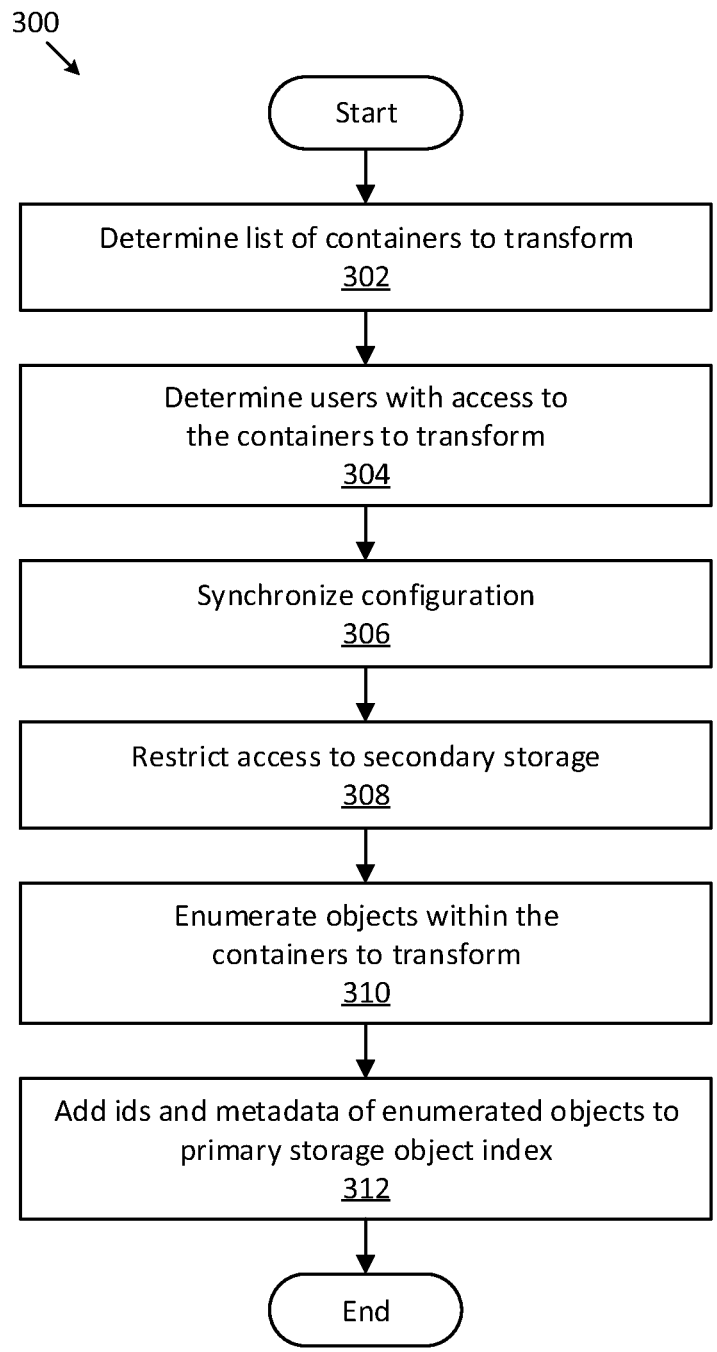
FIGS. 3 and 4 are flow diagrams showing processing that may be implemented within a data storage system, according to embodiments of the disclosure.
Figure 4:
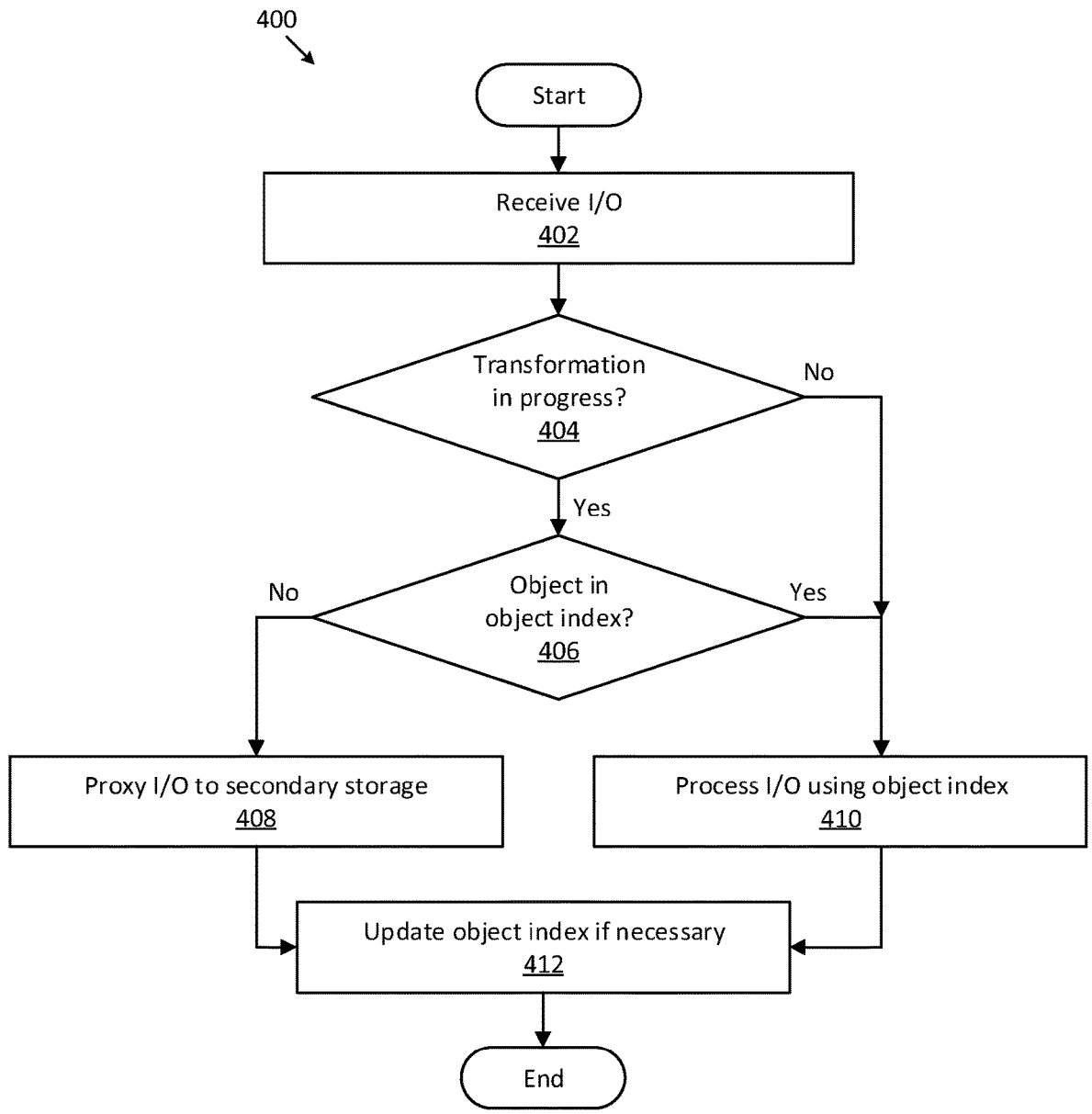

FIGS. 3 and 4 are flow diagrams showing illustrative processing in accordance with embodiments of the disclosure. In some embodiments, some or all of the processing may be implemented within a primary storage system (e.g., system 100 in FIG. 1). In certain embodiments, some of the processing may be implemented within a transformation service (e.g., transformation service 102f of FIG. 1). Rectangular elements (typified by element 302 in FIG. 3) herein denoted "processing blocks," represent computer software instructions or groups of instructions. Diamond shaped elements (typified by element 404 in FIG. 4) herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

Referring to FIG. 3, a process 300 can be used to transform a secondary storage system with a primary storage system, according to an embodiment of the disclosure. At block 302, a list of containers within the secondary storage system to be transformed is determined. In some embodiments, the list of containers may be received as inputs (e.g., via an administrative UI). In other embodiments, the list of containers may be determined automatically using API calls provided by the secondary storage system. In certain embodiments, the list of containers to be transformed includes all containers within the secondary storage system. In various embodiments, the network address of the secondary storage system may be received as input. In many embodiments, the credentials of a user within the secondary storage system may be received as input, wherein the secondary storage user has sufficient privileges to allow the data transformation process to be "bootstrapped" as described herein. For example, the secondary storage user may have access to all containers within secondary storage and may be authorized to create a new user (i.e., the "transformation user") with similar access.

At block 304, users with access to the containers to be transformed are determined. In some embodiments, this includes querying the secondary storage system using API calls to determine, for each container to be transformed, the set of users with read or write access to the container.

At block 306, configuration may be synchronized between the secondary and primary storage systems. In some embodiments, this includes generating the list of containers to be transformed within the primary storage configuration. In certain embodiments, synchronizing configuration includes generating the users having access to those containers within the primary storage configuration. In many embodiments, a dedicated transformation user may be generated within the secondary storage system and the transformation user may be granted access to each of the containers to be transformed.

At block 308, access may be restricted to the secondary storage system. In certain embodiments, a network-based access restriction feature may be used to restrict access to only the primary storage system (or, more particularly, to hosts on which the transformation service may run).

At block 310, all objects within the containers to be transformed may be enumerated. In some embodiments, the transformation user is used to efficiently enumerate objects across multiple containers. At block 312, for each object enumerated, the object's ID and metadata may be added to an object index within primary storage. After all objects have been added to the primary storage object index, the data transformation process 300 may be considered completed. In some embodiments, objects may be enumerated in a parallel and/or distributed manner.

Referring to FIG. 4, a process 400 can be used to process client I/Os at the primary storage system during and after data transformation, according to some embodiments. In other words, the process 400 may be utilized concurrently with process 300 of FIG. 3.

At block 400, an I/O request is received to read/write an object (i.e., to read/write object data or metadata). If the data transformation process has completed, then the request can be processed using the object index (blocks 404, 410). For example, if the I/O request is a request to read or write object metadata, then the request can be processed at the primary storage system using information within the object index. Otherwise, if data transformation is in progress, processing may continue to block 406.

At block 406, if the object is in the primary storage object index, the I/O request is processed using the object index. If the object is not in the object index, then the I/O request may be proxied to the secondary storage system 408.

In the case of an I/O request to add, modify, or delete an object (or object metadata), the process 400 may also update the object index as necessary to maintain consistency between the primary storage object index and secondary storage. For example, if an object is deleted from the secondary storage, the corresponding object is deleted from the object index. If an object is added to one of the secondary storage containers under transformation, the object's ID and metadata are added to the object index.

Figure 5:
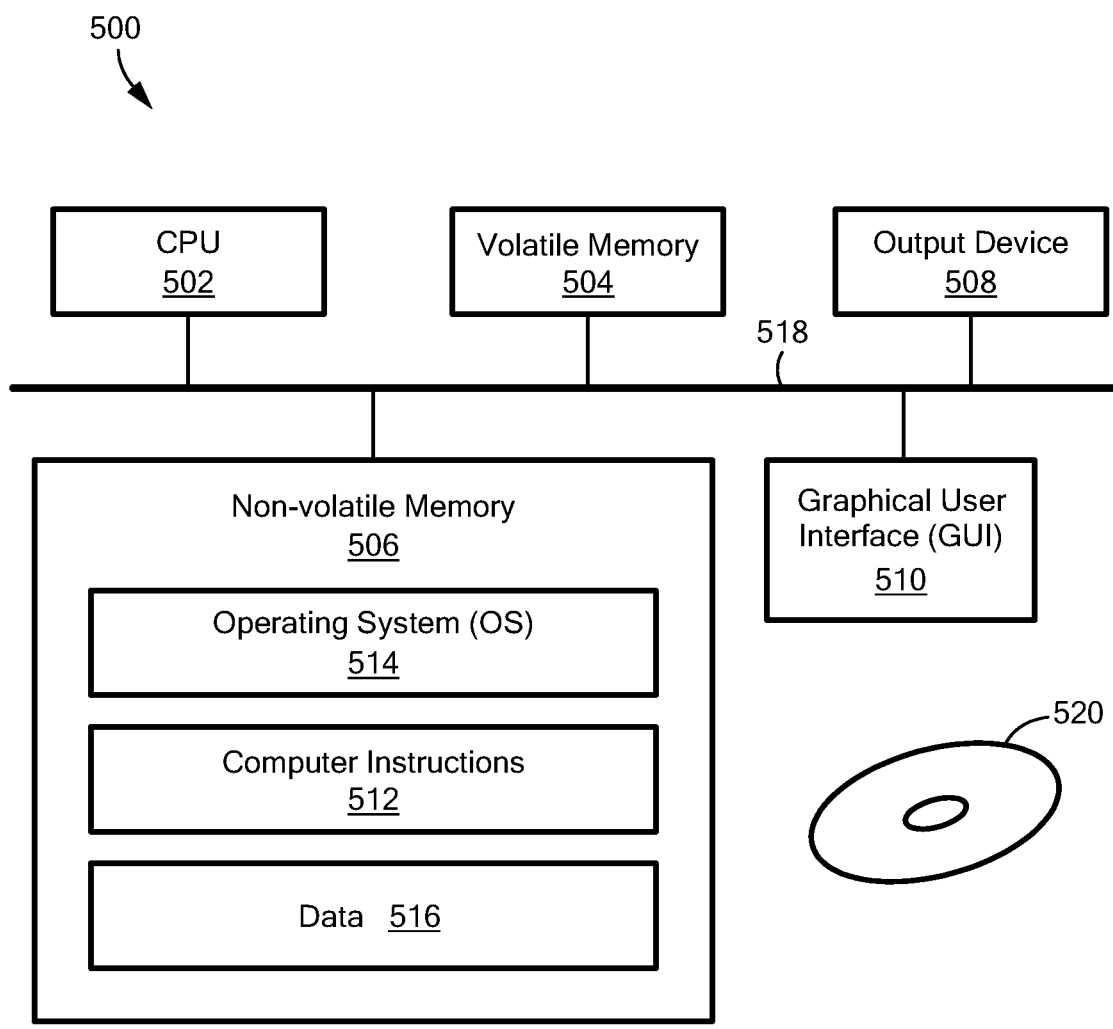
FIG. 5 is block diagram of a computer on which the processing of FIGS. 3 and 4 may be implemented, according to an embodiment of the disclosure.

FIG. 5 shows an illustrative computer or other processing device 500 that can perform at least part of the processing described herein, in accordance with an embodiment of the disclosure. The computer 500 includes a processor 502, a volatile memory 504, a non-volatile memory 506 (e.g., hard disk), an output device 508 and a graphical user interface (GUI) 510 (e.g., a mouse, a keyboard, a display, for example), each of which is coupled together by a bus 518. The non-volatile memory 506 stores computer instructions 512, an operating system 514, and data 516. In one example, the computer instructions 512 are executed by the processor 502 out of volatile memory 504.

In some embodiments, a non-transitory computer readable medium 520 may be provided on which a computer program product may be tangibly embodied. The non-transitory computer-readable medium 520 may store program instructions that are executable to perform the processing of FIGS. 3 and/or 4.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

What is claimed is:

1. A method for transformation processing between a primary storage system and a secondary storage system, the method comprising:
   determining, by the primary storage system, containers within the secondary storage system to perform a transformation, the containers within the secondary storage system storing legacy data;
   determining, by the primary storage system, users having access permissions to the containers subject to the transformation;
   wherein the transformation includes:
      synchronizing storage configuration between the secondary storage system and the primary storage system;
      enumerating objects within the containers including querying the objects for corresponding object metadata; and
      adding object identifiers and the object metadata for the enumerated objects to an object index within the primary storage system, the object index specifying a physical location in the secondary storage system where corresponding enumerated objects are stored; and
   enabling access, by the primary storage system, to at least one of the objects stored on the secondary storage system, without migrating the at least one of the objects to the primary storage system, the access enabled by identifying a physical location of the at least one of the objects via a corresponding one of the object identifiers in the object index;
   wherein enabling access to at least one of the objects includes processing input/output (IO) requests both during and after completion of the transformation, wherein during the transformation, the enabling access includes upon identifying that a request for an object in the secondary storage system has not yet been added to the object index, proxying, by the primary storage system, the request to the secondary storage system.

2. The method of claim 1 wherein determining users having access permissions to the containers includes determining users that have read or write access to one or more of the containers.

3. The method of claim 1 wherein synchronizing the storage configuration between the secondary storage system and the primary storage system includes synchronizing corresponding users and containers between the secondary storage system and the primary storage system.

4. The method of claim 1 wherein enumerating the objects within the containers includes:
   generating a transformation user in the secondary storage system having access permissions to each of the containers; and
   enumerating the objects within the containers using the transformation user.

5. The method of claim 1 further comprising:
   receiving, as input at the primary storage system, a network address of the secondary storage system and credentials of one of the users in the secondary storage system having sufficient privileges to perform the transformation;
   wherein the transformation commences in response to receiving the network address and the credentials.

6. A system for transformation processing between a primary storage system and a secondary storage system, the system comprising:
   a processor;
   a volatile memory; and
   a non-volatile memory storing computer program code that when executed on the processor causes the processor to execute a process operable to perform the operations of:
   determining, by the primary storage system, containers within the secondary storage system to perform a transformation, the containers within the secondary storage system storing legacy data;
   determining, by the primary storage system, users having access permissions to the containers subject to the transformation;
   wherein the transformation includes:
      synchronizing storage configuration between the secondary storage system and the primary storage system;
      enumerating objects within the containers including querying the objects for corresponding object metadata; and
      adding object identifiers and the object metadata for the enumerated objects to an object index within the primary storage system, the object index specifying a physical location in the secondary storage system where corresponding enumerated objects are stored; and
   enabling access, by the primary storage system, to at least one of the objects stored on the secondary storage system without migrating the at least one of the objects to the primary storage system, the access enabled by identifying a physical location of the at least one of the objects via a corresponding one of the object identifiers in the object index;
   wherein enabling access to at least one of the objects includes processing input/output (IO) requests both during and after completion of the transformation, wherein during the transformation, the enabling access includes upon identifying that a request for an object in the secondary storage system has not yet been added to the object index, proxying, by the primary storage system, the request to the secondary storage system.

7. The system of claim 6 wherein determining users having access permissions to the containers includes determining users that have read or write access to one or more of the containers.

8. The system of claim 6 wherein synchronizing the storage configuration between the secondary storage system and the primary storage system includes synchronizing corresponding users and containers between the secondary storage system and the primary storage system.

9. The system of claim 6 wherein enumerating the objects within the containers includes:
generating a transformation user in the secondary storage system having access permissions to each of the containers; and
enumerating the objects within the containers using the transformation user.

10. The system of claim 6 wherein the computer program code that when executed on the processor causes the processor to execute a process further operable to perform the operations of:
receiving, as input at the primary storage system, a network address of the secondary storage system and credentials of one of the users in the secondary storage system having sufficient privileges to perform the transformation;
wherein the transformation commences in response to receiving the network address and the credentials.

11. A computer program product for transformation processing between a primary storage system and a secondary storage system, the computer program product tangibly embodied in a non-transitory computer-readable medium, the computer-readable medium storing program instructions that are executable to:
determine, by the primary storage system, containers within the secondary storage system to perform a transformation, the contains within the secondary storage system storing legacy data;
determine, by the primary storage system, users having access permissions to the containers subject to the transformation;
wherein the transformation includes:
synchronizing storage configuration between the secondary storage system and the primary storage system;
enumerating objects within the containers including querying the objects for corresponding object metadata; and
adding object identifiers and the object metadata for the enumerated objects to an object index within the primary storage system, the object index specifying a physical location in the secondary storage system where corresponding enumerated objects are stored; and
enabling access, by the primary storage system, to at least one of the objects stored on the secondary storage system without migrating the at least one of the objects to the primary storage system, the access enabled by identifying a physical location of the at least one of the objects via a corresponding one of the object identifiers in the object index;
wherein enabling access to at least one of the objects includes processing input/output (IO) requests both during and after completion of the transformation, wherein during the transformation, the enabling access includes upon identifying that a request for an object in the secondary storage system has not yet been added to the object index, proxying, by the primary storage system, the request to the secondary storage system.

12. The computer program product of claim 11 wherein determining users having access permissions to the containers includes determining users that have read or write access to one or more of the containers.

13. The computer program product of claim 11 wherein synchronizing the storage configuration between the secondary storage system and the primary storage system includes synchronizing corresponding users and containers between the secondary storage system and the primary storage system.

14. The computer program product of claim 11 wherein enumerating the objects within the containers includes:
generating a transformation user in the secondary storage system having access permissions to each of the containers; and
enumerating the objects within the containers using the transformation user.

15. The computer program product of claim 11 further comprising:
receiving, as input at the primary storage system, a network address of the secondary storage system and credentials of one of the users in the secondary storage system having sufficient privileges to perform the transformation;
wherein the transformation commences in response to receiving the network address and the credentials.

16. The method of claim 1, wherein synchronizing the storage configuration includes:
creating a container in the primary storage system for each of the containers in the secondary storage system subject to the transformation; and
creating a user in the primary storage system for each of the users having access permissions to the containers subject to the transformation in the secondary storage system.

17. The method of claim 1, further comprising:
upon completion of the transformation, restricting direct access to the secondary storage system, the restricting comprising blocking incoming Internet Protocol (IP) addresses except IP addresses associated with the primary storage system.

* * * * *